(12) United States Patent
Latorre et al.

(10) Patent No.: US 8,190,652 B2
(45) Date of Patent: May 29, 2012

(54) ACHIEVING COHERENCE BETWEEN DYNAMICALLY OPTIMIZED CODE AND ORIGINAL CODE

(75) Inventors: Fernando Latorre, Huesca (ES); Grigorios Magklis, Barcelona (ES); Enric Gibert, Sant Cugat del Vallès (ES); Josep M. Codina, Hospitalet de Llobregat (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 11/951,614

(22) Filed: Dec. 6, 2007

(65) Prior Publication Data

US 2009/0150335 A1 Jun. 11, 2009

(51) Int. Cl.
*G06F 17/30* (2006.01)
(52) U.S. Cl. .................. 707/803; 707/812; 707/828
(58) Field of Classification Search .............. 707/3, 4, 707/713, 803, 812, 828; 711/125, 205
See application file for complete search history.

(56) References Cited

U.S. PATENT DOCUMENTS

| | | | | |
|---|---|---|---|---|
| 6,233,700 B1 * | 5/2001 | Uchida | ............ | 714/20 |
| 6,289,506 B1 | 9/2001 | Kwong et al. | | |
| 6,324,634 B1 * | 11/2001 | Yoshioka et al. | ............ | 711/205 |
| 6,434,665 B1 * | 8/2002 | Shepherd et al. | ............ | 711/118 |
| 6,446,062 B1 * | 9/2002 | Levine et al. | ............ | 1/1 |
| 6,470,492 B2 * | 10/2002 | Bala et al. | ............ | 717/128 |
| 7,114,036 B2 * | 9/2006 | DeWitt et al. | ............ | 711/141 |
| 7,194,736 B2 | 3/2007 | Shi et al. | | |
| 7,228,528 B2 | 6/2007 | Wang et al. | | |
| 7,234,038 B1 * | 6/2007 | Durrant | ............ | 711/203 |
| 7,260,705 B2 | 8/2007 | Wang et al. | | |
| 7,383,389 B1 * | 6/2008 | Bumbulis | ............ | 711/130 |
| 7,409,524 B2 * | 8/2008 | Safford et al. | ............ | 711/205 |
| 7,418,699 B2 | 8/2008 | Metzger et al. | | |
| 7,426,612 B2 * | 9/2008 | Rudd | ............ | 711/141 |
| 7,865,885 B2 | 1/2011 | Wu et al. | | |
| 7,904,879 B2 | 3/2011 | Sowa et al. | | |
| 2005/0138161 A1 * | 6/2005 | McDaniel et al. | ............ | 709/223 |
| 2006/0036809 A1 * | 2/2006 | Rudd | ............ | 711/125 |
| 2006/0136670 A1 * | 6/2006 | Brown et al. | ............ | 711/118 |
| 2007/0043929 A1 * | 2/2007 | Safford et al. | ............ | 711/207 |
| 2007/0294682 A1 * | 12/2007 | Demetriou et al. | ............ | 717/153 |
| 2008/0133875 A1 * | 6/2008 | Cohen et al. | ............ | 711/207 |
| 2008/0155226 A1 * | 6/2008 | Davis et al. | ............ | 711/207 |
| 2009/0063781 A1 * | 3/2009 | Ebersole | ............ | 711/141 |
| 2009/0106502 A1 * | 4/2009 | Ueda et al. | ............ | 711/146 |

* cited by examiner

*Primary Examiner* — Thanh-Ha Dang
(74) *Attorney, Agent, or Firm* — Blakely, Sokoloff, Taylor & Zafman LLP

(57) ABSTRACT

Techniques for achieving coherence between dynamically optimized code and original code are disclosed. In an embodiment, a search is performed for a first entry for a first page containing a first code region in a first data structure. The first code is used to determine whether a first indicator in the first entry is set to a first value. The first entry is added to the first data structure, in response to failing to find the first entry in the first data structure. A second search may be performed for a second entry for the first code region in a second data structure, in response to determining that the first indicator is set to the first value. Other embodiments are also disclosed and claimed.

10 Claims, 4 Drawing Sheets

ACHIEVING COHERENCE BETWEEN DYNAMICALLY OPTIMIZED CODE AND ORIGINAL CODE

COPYRIGHT & TRADEMARK NOTICE

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to dynamic code optimizers in a computing environment, and more particularly to a system and method for achieving coherence between dynamically optimized code and original code.

BACKGROUND

As hardware design grows in complexity, software components such as virtual machines (VMs) may be used to provide compatibility between different generations of hardware. VMs thus help reduce the complexity of hardware design while increasing hardware performance. In particular, VMs emulate physical properties of computing systems and provide compatibility between different hardware systems by adapting applications to run on a specific implementation of a certain hardware design.

Since a VM is implemented in software, a VM needs to refer to virtual memory addresses to access data stored in physical system memory. Virtual addresses are mapped to physical addresses in system memory by way of a translation look-aside buffer (TLB). TLB is a cache comprising certain page table entries that provide the mapping between a virtual address and a physical address. Thus, a physical address may be looked up in the TLB using a virtual address as a search key.

If the mapping for a virtual address is not stored in the TLB, the virtual address is determined based on data stored in a page table. A page table is a data structure that contains mapping information for every virtual address and is therefore very large in comparison to the TLB. Naturally, searching the page table for an address results in slower access speeds in comparison with searching the TLB.

A VM may be also implemented to optimize logic code so that the code can be executed more efficiently. When a code region requiring optimization (i.e., a hot code region) is executed by an application, a VM may optimize the code region and store the code region in a code cache. Subsequently, when the same hot code region is executed by the application, the processor is redirected to the optimized code stored in the code cache and executes the optimized code instead of the original non-optimized code.

An optimization related problem may arise with regard to systems that run applications with self-modifying code. A self-modifying code is a code that alters its instructions during execution. The presence of such feature in a code may result in a code region that is modified after the code region has already been optimized. Effectively, an optimized version of a self-modifying code may not correlate to the original code depending on when the self-modification event takes place.

Coherence between original code and optimized code can be guaranteed by invalidating all optimized code regions on pages that contain modified code, using an instruction TLB (iTLB). Unfortunately, this simple mechanism only guarantees coherence between original code and optimized code for pages with entries in the iTLB. Furthermore, since the iTLB is a type of cache, the amount of space in the iTLB is limited; substantial processing and bookkeeping overhead is introduced when large volumes of entries in the iTLB need to be swapped in and out, between cache memory and slower memory on disk storage, for example.

It is thus easy to see that guaranteeing coherency between original and optimal versions of a logic code can become highly inefficient when optimized code is frequently invalidated and then re-optimized (e.g., due to context switches). Accordingly, systems and methods are desired which can provide a more comprehensive and efficient mechanism for achieving coherence between dynamically optimized code and original code.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to methods and systems for achieving coherence between dynamically optimized code and original code.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a system for achieving coherence between dynamically optimized code and original code is provided. The system comprises a first search logic to search for a first entry for a first page containing a first code region in a first data structure to determine whether a first indicator in the first entry is set to a first value; an adder logic to add the first entry to the first data structure, in response to failing to find the first entry in the first data structure; a second search logic to search for a second entry for the first code region in a second data structure, in response to determining that the first indicator is set to the first value, wherein one or more optimized code regions corresponding to the first page from a code cache are to be removed in response to determining that the first page may have been modified, and wherein the first indicator is to be set to a second value.

In accordance with another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
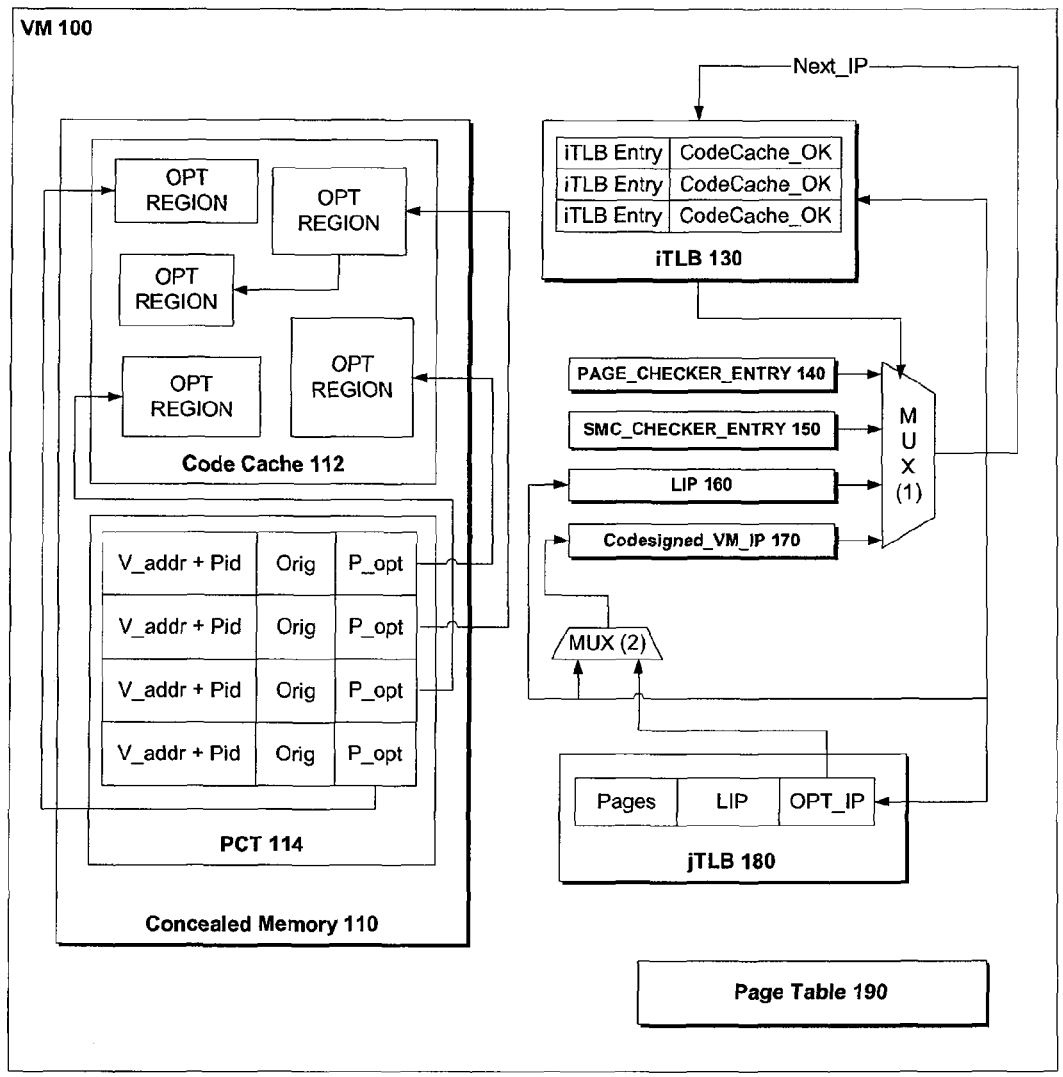
FIG. 1 is a block diagram of an exemplary system for guaranteeing coherence between dynamically optimized code and original code, in accordance with one embodiment.

Referring to FIG. 1, an exemplary VM 100 may comprise concealed memory 110, code cache 112, Page Checker Table (PCT) 114, Instruction Translation Lookaside Buffer (iTLB) 130, PAGE_CHECKER_ENTRY 140, SMC_CHECKER_ENTRY 150, LIP 160, Codesigned_VM_IP 170, Jump Translation Lookaside Buffer (jTLB) 180, and page table 190. The acronyms or particular naming conventions used here are by way of example. It is noteworthy, therefore, that the scope of the invention should not be construed as limited to said exemplary naming conventions. That is, in alternative embodiments, different naming conventions or terminology may be used, without detracting from the scope of the invention.

Concealed memory 110 refers to memory managed by VM 100 to store optimized code regions, bookkeeping information, and other structures. Code cache 112 is the part of concealed memory 110 dedicated to storing optimized code regions. Page table 190 comprises entries that map each virtual memory address to a physical memory address.

iTLB 130 is a cache comprising entries from page table 190 with an additional CodeCache_OK bit that may be initialized to a first value (e.g., approximately 0). VM 100 sets the CodeCache_OK bit to a second value (e.g., approximately 1) when it is determined that the optimized code region stored in code cache 112 is coherent with the corresponding original code. jTLB 180 is a page table cache. Desirably, jTLB 180 is indexed by the physical address of an original code region. A cache hit occurs when an optimized version of the code exists at the physical address pointed to by an entry in jTLB 180. When a cache hit occurs, the processor is re-directed to the optimized code and executes the optimized code instead of the original code.

PCT 114 is a component of concealed memory 110 comprising entries for each page of memory with optimized code regions. Each entry may, for example, comprise 3 fields: <V_addr+pid>, <Orig>, and <P_opt>. <V_addr> stores a unique tag based on the page's virtual address and the process ID of the application that executed the optimized code. <Orig> stores a pointer (i.e., a reference) to an original signature for a lossless version of the original code on the memory page. The original signature (or Orig signature) may, for instance, be the entire or compressed version of the data on the page. <P_opt> stores a pointer to the optimized code region belonging to the original code on the memory page. Optimized code regions belonging to the same memory page may be linked through pointers, for example.

In one embodiment, PCT 114 may replace the process ID in the <V_addr+pid> field with the page directory base pointer (CR3 register). The process ID may not be available to the hardware, and the CR3 register generally remains unchanged during the execution of an application. Regardless of whether the process ID or the CR3 register is used, PCT 114 retains correctness even in cases where an operating system reuses process IDs or page directory space.

Referring back to FIG. 1, PAGE_CHECKER_ENTRY 140, SMC_CHECKER_ENTRY 150, LIP 160, and Codesigned_VM_IP 170 may be hardware structures that hold pointers to IP addresses (i.e., physical addresses). PAGE_CHECKER_ENTRY 140 is, for example, a register that holds the IP address of the routine used by system 100 to analyze whether data in a memory page is coherent with the optimized code regions in the code cache. PAGE_CHECKER_ENTRY 140 may be initialized by VM 100 at boot time.

SMC_CHECKER_ENTRY 150 is a register that holds the IP address of the routine used by co-design VM 100 to manage self-modifying code. This routine is called when the memory address modified by a store matches with an entry in iTLB 130. SMC_CHECKER_ENTRY 150 may be also initialized by VM 100 at boot time. LIP 160 and Codesigned_VM_IP 170 are registers that hold the next IP address for the original code and optimized code, respectively.

The multiplexors (MUX) in FIG. 1 behave like switches. For example, MUX (1) selects one of the pointers stored in PAGE_CHECKER_ENTRY 140, SMC_CHECKER_ENTRY 150, LIP 150, and Codesigned_VM_IP 170 to output. The selected output, or Next_IP, points to the IP address of the next code region to be executed by the processor. MUX (2) selects between a pointer from MUX (1) and a pointer from jTLB 180, for example. In a certain embodiment, both PAGE_CHECKER_ENTRY 140 and SMC_CHECKER_Entry 150 may be implemented into a single register with the assistance of software switches. In yet another embodiment, both LIP 160 and Codesigned_VM_IP may be implemented into a single register.

Figure 2:
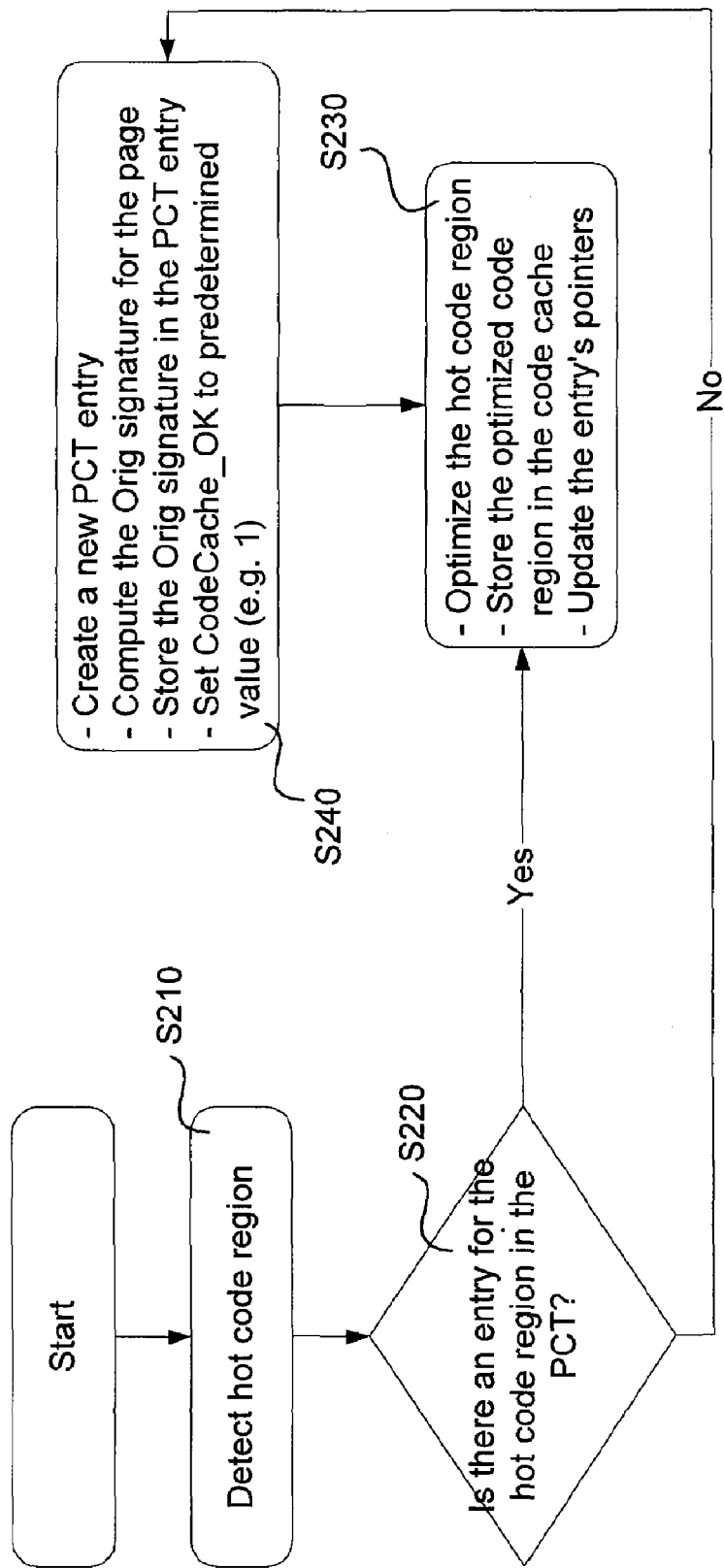
FIG. 2 is a flow diagram of an exemplary method for optimizing code, in accordance with one embodiment.

Referring to FIGS. 1 and 2, in accordance with one embodiment, when a hot code region is detected (S210), VM 100 determines whether there is an entry for the hot code region in PCT 114 (S220). If an entry exists, the hot code region is optimized and stored in code cache 112, and the entry's pointers are updated (S230). In one exemplary embodiment, coherency may not be checked until the optimized code is fetched for execution. In another exemplary embodiment, it is possible to check for coherency when a hot code region is being optimized.

If an entry does not exist in PCT 114, a new entry is created, an Orig signature is computed for the corresponding page and stored in <Orig>, and the CodeCache_OK bit for the page's iTLB entry is set to a certain value (e.g., approximately 1) (S240). The code region is then optimized as provided earlier in block (S230). When PCT 114 runs out of storage space, entries pointing to invalid optimized regions may be deleted. If one or more (e.g., all) the entries point to valid regions, depending on implementation, either the current hot code region is not optimized, or one or more (e.g., all) of the optimized regions pointed at by a given entry are invalidated (i.e., code regions located on the same page are invalidated).

Figure 3:
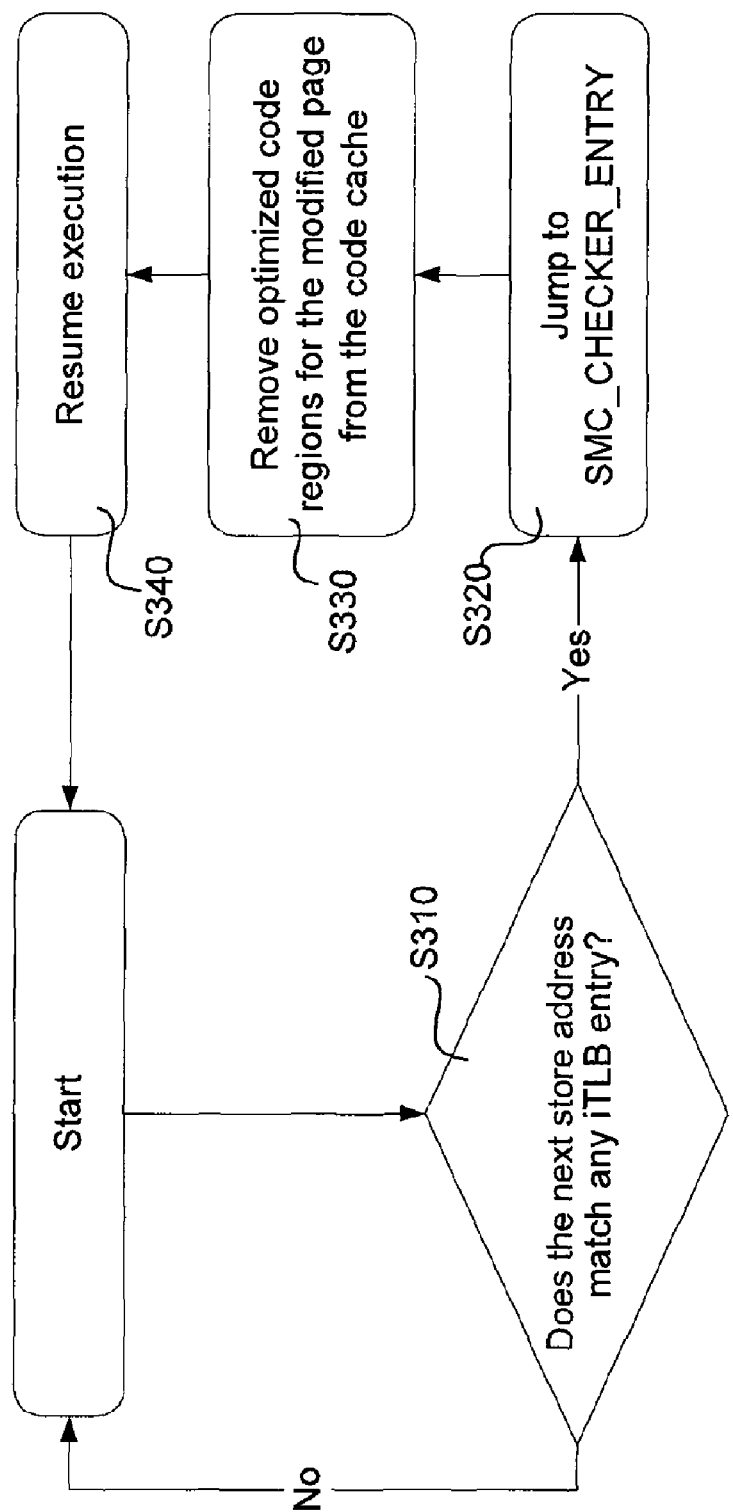
FIG. 3 is a flow diagram of an exemplary method for managing self-modifying code on an iTLB cache hit, in accordance with one embodiment.

In one embodiment, memory pages may be modified regardless of whether the pages are referenced by entries iTLB 130. Referring to FIGS. 1 and 3, in accordance with one embodiment, the memory address written by a store operation is looked up in iTLB 130 to determine whether there is an iTLB entry for the page that includes this memory address (S310). If there is a match (i.e., a cache hit) and the Code-Cache_OK bit is set to a value (e.g., approximately 1), the processor jumps to the IP address stored in SMC_CHECKER_ENTRY 150 and executes the routine for managing self-modifying code (S320). VM 100 removes the optimized code regions for the modified page from code cache 112 (S330) before resuming execution (S340).

If the page is not in iTLB 130 (i.e., a cache miss), it may not be possible to determine whether the page has been modified or is being modified in a self-modifying code. However, since conventional processors cannot execute instructions from a page that is not in iTLB 130, whether the page has been modified is irrelevant. But, once the page is pointed at by iTLB 130 again, it may be desirable to verify that the page has not been modified.

VM 100 may verify that the page has not been modified by computing the Orig signature of each page that produced a cache miss in iTLB 130 and comparing the computed Orig signatures with the values stored in PCT 114. When pages with inconsistent Orig signatures have been modified, it may be determined that optimized code regions for the pages are invalid. Managing cache misses in iTLB 130 may be inefficient, if cache misses in iTLB 130 are penalized as provided above, including cache misses for pages that were not optimized.

Figure 4:
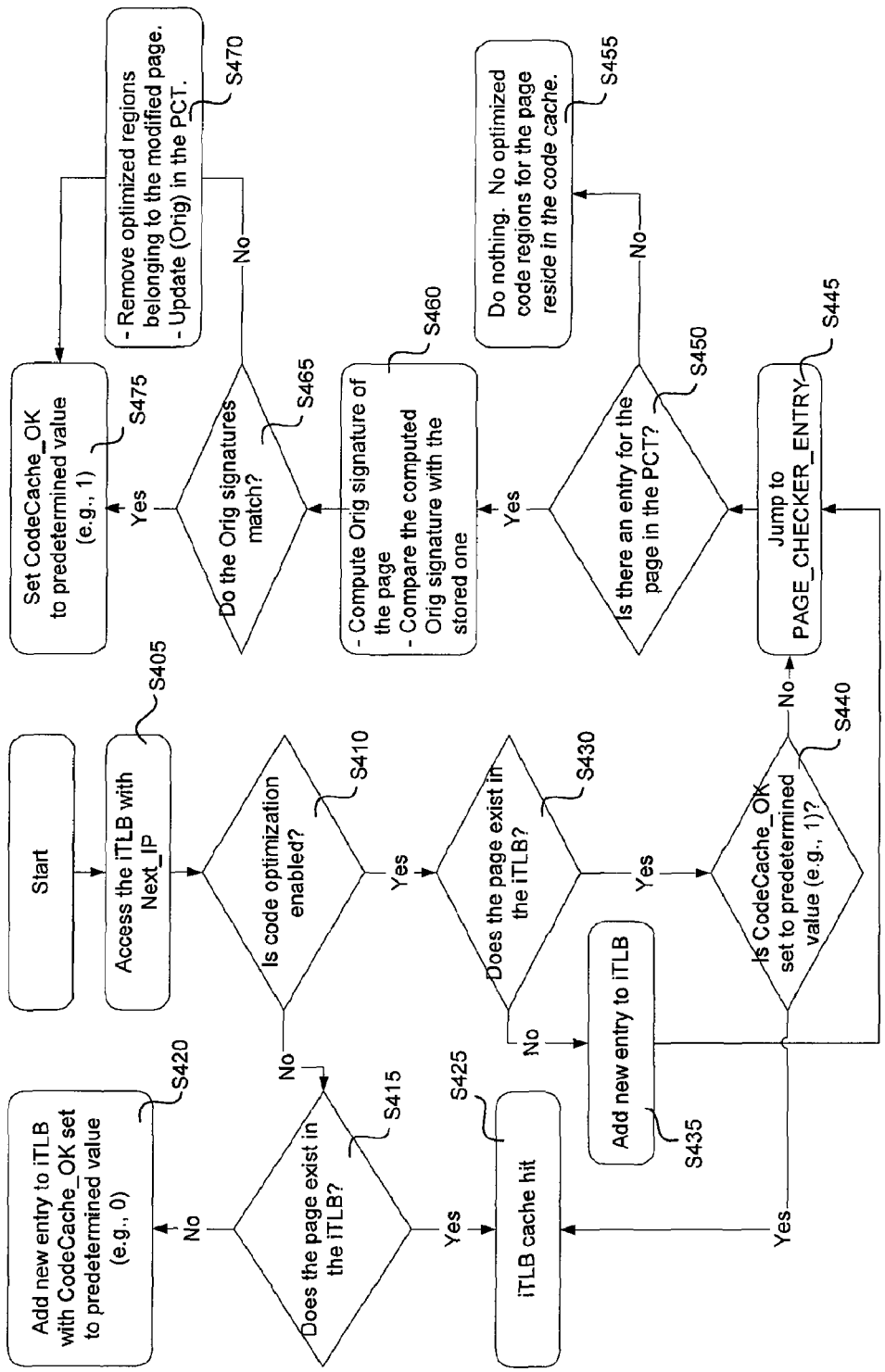
FIG. 4 is a flow diagram of an exemplary method for managing self-modifying code on an iTLB cache miss, in accordance with one embodiment.

Referring to FIGS. 1 and 4, CodeCache_OK bits may be used to manage caches misses in iTLB 130 more efficiently. In accordance with one embodiment, the code region referenced by Next_IP may access iTLB 130 (S405). If code optimization is not enabled (S410) and the page for the code region does not exist in iTLB 130 (S415), a new entry is added to iTLB 130 with CodeCache_OK initialized to a value (e.g., approximately 0) (S420).

If code optimization is not enabled (S410) and the page for the code region does exist in iTLB 130 (S415), then there is a iTLB cache hit (S425). In another implementation, there may be no need to check for coherency when code optimization is not enabled. CodeCache_OK may be set to a value (e.g., approximately 0) because the page may not be coherent with optimized code regions in code cache 112.

Referring back to block (S410), if code optimization is enabled and the page does not exist in iTLB 130 (S430), a new entry is added to iTLB 130 (S435). If the page exists and CodeCache_OK is set to a value (e.g., approximately 1) (S440), there is a cache hit (S425). When CodeCache_OK is set to the value (e.g., approximately 1), it means that the page has not been modified and is coherent with optimized code regions in code cache 112. If CodeCache_OK is not set to the value (e.g., approximately 1) (S440), VM may jump to the IP address stored in PAGE_CHECKER_ENTRY 140 (S445) and analyze whether data in a memory page is coherent with optimized code regions in code cache 112, as provided in FIG. 3.

If an entry for the page does not exist in PCT 114, VM 100 may do nothing because no optimized code regions for the page are residing in code cache 112 (S450-S455). If an entry for the page exists in PCT 114, the page's Orig signature is computed and then compared to the Orig signature stored in that entry (S450-S460). The Orig signatures may be checked using any algorithm that compares signatures such as Cyclic Redundancy Check (CRC), for example. If the Orig signatures do not match (S465), the optimized code regions for the page are removed and PCT 114 is updated with the computed Orig signature (S470). If the Orig signatures match, CodeCache_OK is set to a value (e.g., approximately 1). Setting the CodeCache_OK bit indicates that the optimized code regions for the page are coherent with the original code. Thus, the page does not have to be checked for coherency until the entry for the page is removed from iTLB 130 and added back again.

In one embodiment, VM 100 may be modified to efficiently manage a pseudo self-modifying code. Pseudo self-modifying code refers to data regions that share a memory page with code regions. Modifying data in the data regions may unnecessarily invalidate optimized code regions for the page resulting in decreased performance. To avoid this situation, PCT 114 may be implemented so that an Orig signature is computed for each optimized region instead of for each page. Each optimized code region may be linked to a page offset and code length in addition to an Orig signature.

It is noteworthy that in certain embodiments a code region may traverse more than one page of memory. In such a situation, PCT 114 may store one Orig signature per page as shown in FIG. 1. If a page is modified, the optimized code on the modified page is checked for coherency in order to keep the checking routine simple and avoid additional cache misses in iTLB 130. Also, in a multi-processor or multi-core computing system, a memory page may be modified by one processor while another processor is optimizing the page. In one embodiment, each processor is notified when a page is being modified, so that code optimization is aborted if the optimization occurs simultaneously.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

The invention claimed is:

1. An apparatus comprising:
a processor to execute code;
a first search logic to search for a first entry for a first page containing a first code region in a first data structure to determine whether a first indicator in the first entry is set to a first value;
an adder logic to add the first entry to the first data structure, in response to failing to find the first entry in the first data structure; and
a second search logic to search for a second entry for the first code region in a second data structure, in response to determining that the first indicator is set to the first value, wherein the apparatus is configured to remove one or more dynamically optimized code regions corresponding to the first page from a code cache in response to determining that the first page has been modified, wherein the apparatus is configured to set the first indicator to a second value, and wherein the first value is to indicate whether code on a page is not coherent with one or more corresponding dynamically optimized code regions in the code cache.

2. The apparatus of claim 1, further comprising first indicator set logic to set the first indicator to the first value, in response to determining that dynamic code optimization is disabled.

3. The apparatus of claim 1, wherein the second value indicates that code on a page is coherent with one or more corresponding dynamically optimized code regions in the code cache.

4. The apparatus of claim 1, further comprising signature computation logic to compute a first signature for the first page and to compare the first signature to a second signature in the second entry.

5. The apparatus of claim 1, further configured to:
detect a second code region that is dynamically optimized;
search for a third entry for the second code region in the second data structure to determine whether dynamically optimized code for the second code region already exists in the code cache;
add the third entry to the second data structure, in response to failing to find the third entry in the second data structure;
dynamically optimize the second code region;
store the dynamically optimized code corresponding to the second code region in the code cache; and
update the third entry.

6. The apparatus of claim 5, wherein the second code region references an offset for a second page and a value indicating a length of the second code region.

7. A system comprising:
a memory to store instructions;
a processor to fetch the instructions, wherein the processor includes:
a first search logic to search for a first entry for a first page containing a first code region in a first data structure to determine whether a first indicator in the first entry is set to a first value;
an adder logic to add the first entry to the first data structure, in response to failing to find the first entry in the first data structure; and
a second search logic to search for a second entry for the first code region in a second data structure, in response to determining that the first indicator is set to the first value, wherein the system is configured to remove one or more dynamically optimized code regions corresponding to the first page from a code cache in response to determining that the first page has been modified, wherein the system is configured to set the first indicator to a second value, and wherein the first value is to indicate whether code on a page is not coherent with one or more corresponding dynamically optimized code regions in the code cache.

8. The system of claim 7, further comprising first indicator set logic to set the first indicator to the first value, in response to determining that dynamic code optimization is disabled.

9. The system of claim 7, wherein the second value indicates that code on a page is coherent with one or more corresponding dynamically optimized code regions in the code cache.

10. The system of claim 7, further comprising signature computation logic to compute a first signature for the first page and compare the first signature to a second signature in the second entry.

* * * * *